(12) United States Patent
Kasher (10) Patent No.: US 9,472,844 B2
(45) Date of Patent: Oct. 18, 2016

(54) APPARATUS, SYSTEM AND METHOD OF WIRELESS BEAMFORMED COMMUNICATION

(71) Applicant: INTEL CORPORATION, Santa Clara, CA (US)

(72) Inventor: Assaf Kasher, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 678 days.

(21) Appl. No.: 13/794,988

(22) Filed: Mar. 12, 2013

(65) Prior Publication Data

US 2014/0266900 A1    Sep. 18, 2014

(51) Int. Cl.
*H01Q 3/00* (2006.01)
*H01Q 3/26* (2006.01)
*H04B 7/06* (2006.01)
*H04B 7/08* (2006.01)

(52) U.S. Cl.
CPC .............. *H01Q 3/26* (2013.01); *H04B 7/0617* (2013.01); *H04B 7/0848* (2013.01)

(58) Field of Classification Search
CPC ........ H01Q 3/00; H01Q 3/26; H04B 7/0617; H04B 7/0848
USPC ................................. 342/372, 377
See application file for complete search history.

(56) References Cited

U.S. PATENT DOCUMENTS

| | | | | |
|---|---|---|---|---|
| 6,088,055 | A * | 7/2000 | Lareau | G01C 11/02 348/113 |
| 8,339,307 | B2 * | 12/2012 | Craig | H04B 7/18515 342/354 |
| 2002/0164945 | A1 * | 11/2002 | Olsen | G01V 8/005 455/3.01 |
| 2003/0184752 | A1 | 10/2003 | Kogan et al. | |
| 2006/0264754 | A1 * | 11/2006 | Frisa | A61B 8/145 600/447 |
| 2006/0287596 | A1 * | 12/2006 | Johnson | A61B 5/4312 600/437 |
| 2008/0245148 | A1 * | 10/2008 | Fukumoto | G01P 15/18 73/504.12 |
| 2008/0259731 | A1 | 10/2008 | Happonen | |
| 2010/0157952 | A1 * | 6/2010 | Li | H04W 72/1252 370/336 |
| 2010/0174421 | A1 * | 7/2010 | Tsai | G06F 1/1616 700/302 |
| 2010/0231442 | A1 | 9/2010 | Craig et al. | |
| 2011/0148754 | A1 * | 6/2011 | Inagaki | G01S 5/02 345/156 |
| 2011/0222616 | A1 * | 9/2011 | Jiang | H04B 7/0417 375/260 |
| 2011/0309980 | A1 | 12/2011 | Ali et al. | |
| 2012/0182429 | A1 * | 7/2012 | Forutanpour | H04R 3/005 348/175 |

(Continued)

FOREIGN PATENT DOCUMENTS

WO    WO 2013089679 A1 *   6/2013   .......... H04B 7/0617

OTHER PUBLICATIONS

International Search Report and Written Opinion for PCT Patent Application No. PCT/US2014/018138, mailed on Jun. 27, 2014, 14 pages.
Wireless-Gigabit-Alliance (WGA) specifications (Wireless Gigabit Alliance, Inc WiGig MAC and PHY Specification Version 1.0, Final specification), Apr. 2010.

(Continued)

*Primary Examiner* — Harry Liu
(74) *Attorney, Agent, or Firm* — Shichrur & Co.

(57) ABSTRACT

Some demonstrative embodiments include apparatuses, systems and/or methods of wireless beamformed communication. For example, an apparatus may include a controller to receive image information representing a plurality of images captured by a mobile device during communication of the mobile device over a wireless beamformed link, and to update a beamforming scheme of the wireless beamformed link based on the image information.

29 Claims, 6 Drawing Sheets

(56) References Cited

U.S. PATENT DOCUMENTS

| | | | |
|---|---|---|---|
| 2012/0275261 A1* | 11/2012 | Kim | G01S 7/52047 |
| | | | 367/7 |
| 2012/0284619 A1 | 11/2012 | Myllyla et al. | |
| 2014/0203966 A1* | 7/2014 | Sultenfuss | H01Q 1/2266 |
| | | | 342/368 |
| 2014/0218236 A1* | 8/2014 | Sadeghi | H04W 16/28 |
| | | | 342/367 |
| 2014/0324888 A1* | 10/2014 | Xie | G06F 3/017 |
| | | | 707/748 |

OTHER PUBLICATIONS

IEEE Std 802.11™-2012. Part 11: Wireless LAN Medium Access Control (MAC) and Physical Layer (PHY) Specifications, IEEE Standard for Information technology. Telecommunications and information exchange between systems Local and metropolitan area networks—Specific requirements, Mar. 29, 2012.

International Preliminary Report on Patentability for International Application No. PCT/US2014/018138, mailed Sep. 24, 2015, 10 pages.

* cited by examiner

APPARATUS, SYSTEM AND METHOD OF WIRELESS BEAMFORMED COMMUNICATION

TECHNICAL FIELD

Embodiments described herein generally relate to wireless beamformed communication.

BACKGROUND

Beamforming may be used by antenna arrays for directional and/or spatial signal transmission and/or reception.

A beamforming training session may be implemented by two wireless communication devices in order, for example, to select effective receive and/or transmit beamforming patterns to be used for wireless communication between the devices.

The beamforming training session may require a relatively large amount of time and may consume a large amount of power.

Repeatedly performing the beamforming training session may reduce the effectiveness of the directional and/or spatial signal transmission and/or reception.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AN) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11 task group ac (TGac) ("IEEE802.11-09/0308r12 TGac Channel Model Addendum Document"); IEEE 802.11 task group ad (TGad) (IEEE P802.11ad Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band)) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band.

The term "beamforming", as used herein, may relate to a spatial filtering mechanism, which may be used at a transmitter and/or a receiver to improve the received signal power or signal-to-noise ratio (SNR) at an intended receiver.

Figure 1:
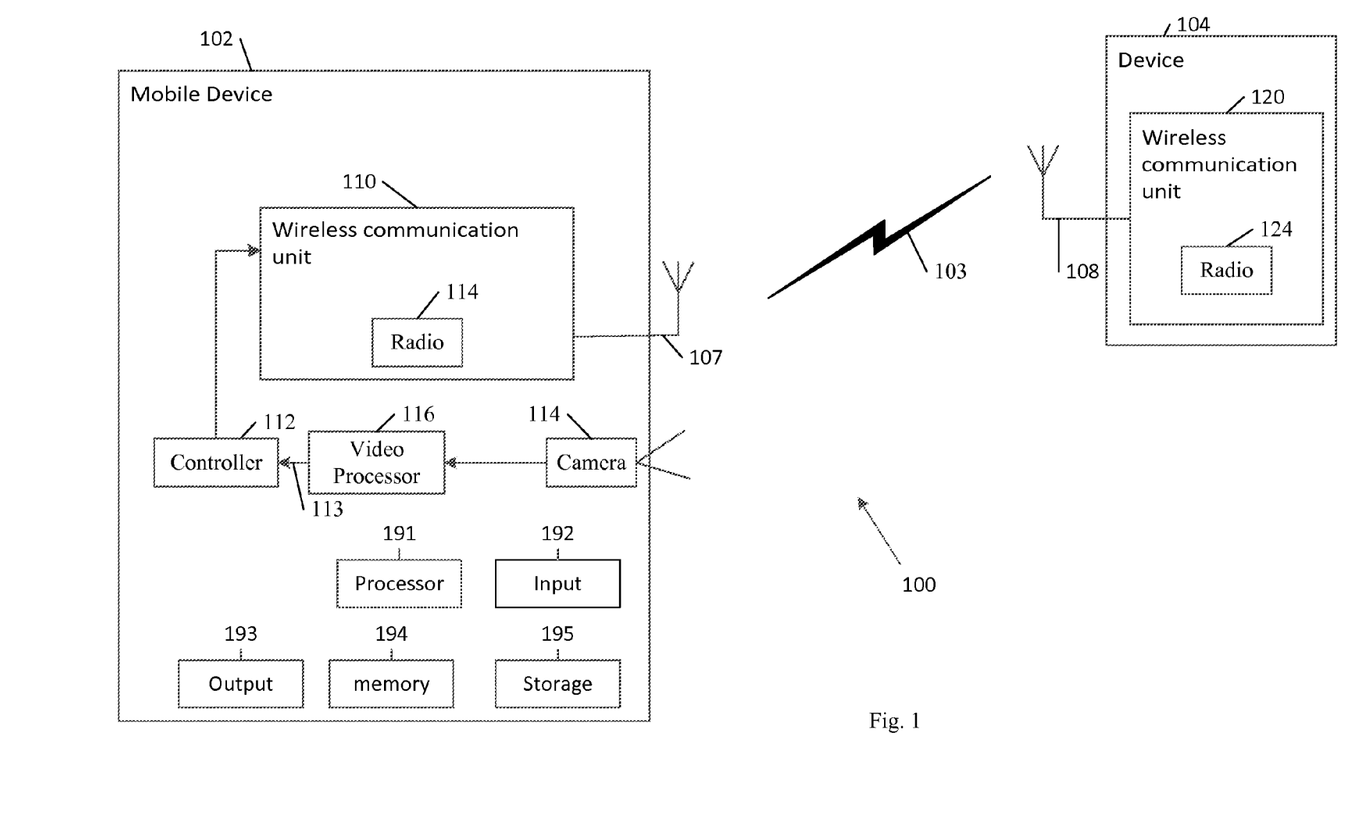
FIG. 1 is a schematic block diagram illustration of a system, in accordance with some demonstrative embodiments.

Reference is now made to FIG. 1, which schematically illustrates a block diagram of a system 100, in accordance with some demonstrative embodiments.

In some demonstrative embodiments, system 100 may include a wireless communication network including one or more wireless communication devices, e.g., wireless communication devices 102 and/or 104, capable of communicating content, data, information and/or signals over a wireless communication link, for example, over a radio channel, an IR channel, a RF channel, a Wireless Fidelity (WiFi) channel, and the like. One or more elements of system 100 may optionally be capable of communicating over any suitable wired communication links.

In some demonstrative embodiments, devices 102 and/or 104 may include a wireless communication unit capable of communicating content, data, information and/or signals over a wireless communication link 103. For example, device 102 may include a wireless communication unit 110 and device 104 may include a wireless communication unit 120.

In some demonstrative embodiments, wireless communication units 110 and/or 120 may include, or may be associated with, one or more antennas 107 and 108, respectively. Antennas 107 and/or 108 may include any type of antennas suitable for transmitting and/or receiving wireless communication signals, blocks, frames, transmission streams, packets, messages and/or data. For example, antennas 107 and/or 108 may include any suitable configuration, structure and/or arrangement of one or more antenna elements, components, units, assemblies and/or arrays. Antennas 107 and/or 108 may include, for example, antennas suitable for directional communication, e.g., using beamforming techniques. For example, antennas 107 and/or 108 may include a phased array antenna, a single element antenna, a set of switched beam antennas, and/or the like. In some embodiments, antennas 107 and/or 108 may implement transmit and receive functionalities using separate transmit and receive antenna elements. In some embodiments, antennas 107 and/or 108 may implement transmit and receive functionalities using common and/or integrated transmit/receive elements.

In some demonstrative embodiments, wireless communication units 110 and/or 120 may include, for example, one or more radios, e.g., radios 114 and 124, including one or more wireless transmitters, receivers and/or transceivers able to send and/or receive wireless communication signals, RF signals, frames, blocks, transmission streams, packets, messages, data items, and/or data.

In some demonstrative embodiments, wireless communication devices 102 and/or 104 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

Devices 102 and/or 104 may also include, for example, one or more of a processor 191, an input unit 192, an output unit 193, a memory unit 194, and a storage unit 195. Device 102 may optionally include other suitable hardware components and/or software components. In some demonstrative embodiments, some or all of the components of device 102 may be enclosed in a common housing or packaging, and may be interconnected or operably associated using one or more wired or wireless links. In other embodiments, components of device 102 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, device 102 may include, or may be included as part of a mobile or portable device, for example, a Smartphone, a mobile phone, a mobile computer, a laptop computer, a notebook computer, a tablet computer, a handheld computer, a handheld device, a PDA device, a handheld PDA device, an on-board device, an off-board device, a hybrid device, a consumer device, a vehicular device, a non-vehicular device, a cellular telephone, a PCS device, a PDA device which incorporates a wireless communication device, a mobile or portable GPS device, a relatively small computing device, a non-desktop computer, a CSLL device, an UMD, an UMPC, an MID, an "Origami" device or computing device, a device that supports DCC, a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a music player, or the like.

In some demonstrative embodiments device 104 may include, or may be included as part of a mobile device or as part of a non-mobile device, for example, a wireless router, an access point (AP), a personal computer (PC), a docking device, and/or the like.

In some demonstrative embodiments, wireless communication link 103 may include a direct link, e.g., a P2P link, for example, to enable direct communication between devices 102 and 104.

In some demonstrative embodiments, wireless communication link 103 may include a wireless communication link over the DMG band.

In some demonstrative embodiments, wireless communication devices 102 and/or 104 may perform the functionality of DMG stations ("DMG STA"). For example, wireless communication devices 102 and/or 104 may be configured to communicate over the DMG band.

In some demonstrative embodiments, wireless communication link 103 may include a wireless beamformed link.

In some demonstrative embodiments, wireless communication link 103 may include a wireless gigabit (WiGig) link. For example, wireless communication link 103 may include a wireless beamformed link over the 60 GHZ frequency band.

In other embodiments, wireless communication link 103 may include any other suitable link and/or may utilize any other suitable wireless communication technology.

In some demonstrative embodiments, antennas 107 may include an antenna array configured to communicate over wireless communication link 103 in a directional manner utilizing a beamforming scheme of antennas 107.

For example, antennas 107 may include at least one antenna array including one or more antenna elements. Shifting phases of one or more antenna elements of antennas 107, e.g., by one or more phase shifters, may provide a constructive and/or destructive interference, configured to change the beamforming scheme of antennas 107 and to change the directionality of antennas 107.

In some demonstrative embodiments, wireless communication units 110 and/or 120 may establish wireless communication link 103 between devices 102 and 104. For example, device 102 may utilize wireless communication link 103 to communicate with device 104, for example, to receive data from device 104, e.g., which may be connected to the Internet.

In some demonstrative embodiments, a beamforming training session may be performed between devices 102 and 104 to establish wireless communication beamformed link 103 and/or to adjust a beamforming scheme of wireless communication link 103, e.g., to improve a received signal power or signal-to-noise ratio (SNR) of radios 114 and 124.

In some demonstrative embodiments, the beamforming training may configure the beamforming scheme of antennas 107 for communicating with device 104 over wireless communication link 103.

For example, the beamforming scheme may include a configuration of the one or more antenna elements of antennas 107 and, accordingly, the directionality of antennas 107.

In some demonstrative embodiments, a user of device 102 may physically manipulate device 102, while devices 102 and 104 are communicating over wireless beamformed link 103.

The phrase "physical manipulation" as used herein with reference to a device may include changing a placement of at least one element of the device.

The term "placement" as used herein with reference to a device may include a position, a location, a rotation, and/or an orientation of the device. For example, the physical manipulation of device 102 may include changing an orientation, a movement, a rotation, and/or a displacement of at least one element of device 102.

In some demonstrative embodiments, the placement of antennas 107 may be changed, e.g., as a result of the physical manipulation of device 102.

In one example, the user of device 102 may move and/or change the orientation of device 102 and, as a result, the position and/or the orientation of antennas 107 may be changed.

In another example, the placement of antennas 107 may be changed as a result of a physical manipulation of a part and/or an element of device 102, e.g., if antennas 107 are housed within the part and/or the element being manipulated. For example, device 102 may include a device, e.g., a notebook, including a base and a lid rotatable with respect to the base, and antennas 107 may be housed within the lid. Accordingly, a rotation of the lid, e.g., between an open state and a closed state, may change an orientation of antennas 107. However, if antennas 107 are housed within the base, a rotation of the lid may not affect the orientation of antennas 107.

In some demonstrative embodiments, the quality of wireless communication link 103 may be reduced, e.g., if a beamforming scheme of wireless communication link 103 is not updated, responsive to the placement change of antennas 107.

For example, a direction of a beam formed by antennas 107 may be directed to device 104. The beam formed by antennas 107 may be directed to a different direction, which is not directed to device 104, e.g., if the orientation and/or the position of antennas 107 are changed. As a result, the quality of wireless communication link 103 may be reduced and/or wireless communication link 103 may be disconnected.

Performing the beamforming training every time the quality of wireless communication link 103 is reduced may last a relatively long period of time and may consume a large amount of power.

In some demonstrative embodiments, device 102 may utilize image information of one or more images captured by device 102 to update the beamforming scheme of wireless beamformed link 103. Utilizing the image information may enable, for example, to update the beamforming scheme of wireless communication link 103, for example, before the quality of beamformed link 103 is reduced and/or before wireless communication link 103 is disrupted and/or disconnected, e.g., as described below.

In some demonstrative embodiments, device 102 may include a controller 112 configured to receive image information 113 representing a plurality of images captured by device 102 during communication over wireless beamformed link 103.

In some demonstrative embodiments, controller 112 may be implemented as part of wireless communication unit 110. In other embodiments, controller 112 may be implemented as a separate element or as part of another element of device 102.

In some demonstrative embodiments, device 102 may include at least one camera 114 to capture the plurality of images. For example, camera 114 may include a digital camera, a webcam, or the like.

In some demonstrative embodiments, controller 112 may update the beamforming scheme of wireless communication link 103 based on image information 113, e.g., as described in detail below.

In some demonstrative embodiments, camera 114 may capture a plurality of images during communication over wireless beamformed link 103. For example, camera 114 may capture an image every predefined time period, e.g., 6 milliseconds (ms), or according to any other periodic or non-periodic scheme.

In some demonstrative embodiments, device 102 may include a video processor 116 configured to process, e.g., to encode, the plurality of images captured by camera 114. For example, video processor 116 may include one or more suitable video encoders, e.g., a Moving Picture Experts Group (MPEG) video encoder, an Audio Video Interleaved (AVI) video encoder and/or the like.

In some demonstrative embodiments, video processor 116 may be configured to provide to controller 112 image information 113 representing the plurality of images.

In some demonstrative embodiments, video processor 116 may be implemented as part of camera 114. In other embodiments, video processor 116 may be implemented as part of controller 112, or as a separate element, and/or as a part and/or a module of another element of device 102.

In some demonstrative embodiments, image information 113 may include information corresponding to the plurality of images captured by camera 114.

In some demonstrative embodiments, image information 113 may be indicative of a change of one or more placement-related parameters with respect to device 102, camera 114, and/or antennas 107. For example, image information 113 may be indicative of a change in an elevation, and/or an azimuth of device 102, camera 114, and/or antennas 107.

In some demonstrative embodiments, image information 113 may indicate a placement change of device 102, camera 114, and/or antennas 107, e.g., if a first image of the plurality of images is different from a second image of the plurality of images.

In some demonstrative embodiments, image information 113 may indicate a placement change of antennas 107, e.g., if image information 113 indicates a difference between two subsequent images of the plurality of images, e.g., responsive to a physical manipulation of device 102 between capturing the two subsequent images.

In one example, the two subsequent images may include two immediately subsequent images.

In another example, the two subsequent images may include two non-consecutive images. For example, image information 113 may indicate a difference between a first image of the plurality of images, which was captured after the beamforming training, and a second image, which is captured a relatively long time period after the beamforming training, e.g., responsive to non-movement and/or a relatively slow movement of device 102 during the relatively long time period.

In some demonstrative embodiments, image information 113 may include one or more motion vectors representing the difference between the plurality of images. The motion vectors may include a plurality of vectors directed to one or more different directions.

In some demonstrative embodiments, the motion vectors may indicate a placement change of device 102, camera 114, and/or antennas 107.

In some demonstrative embodiments, controller 112 may detect a placement change of antennas 107 based on the motion vectors of image information 113.

In one example, the motion vectors of image information 113 may indicate a placement change of antennas 107 if, for example, device 102 is moved from a first location to a second location, different from the first location. A first image captured by camera 114 at the first location may be different from a second image captured by camera 114 at the second location. Accordingly, image information 113 may include one or more motion vectors directed in a direction corresponding to the movement.

In another example, the motion vectors of image information 113 may indicate a placement change of antennas 107 if, for example, device 102 is rotated between a first angle, and a second angle, different from the first angle. For example, device 102 may be rotated between the two angles as a result of a change in azimuth and/or elevation of device 102. A first image captured by camera 114 at the first angle may be different from a second image captured by camera 114 at the second angle. Accordingly, image information 113 may include one or more motion vectors directed to a direction corresponding to the rotation.

In a further example, device 102 may include at least one element, which is movable and/or rotatable, e.g., independently from a movement and/or a rotation of device 102. The motion vectors of image information 113 may indicate a placement change of antennas 107, for example, if antennas 107 are housed within the element of device 102, which is being rotated. For example, device 102 may include a device, e.g., a laptop, including a base and a lid rotatable with respect to the base, e.g., between open and closed states. Antennas 107 and camera 114 may be, for example, housed within the lid. A first image captured by camera 114 at the open state, may be different from a second image captured by camera 114 at the closed state. Accordingly, image information 113 may include one or more motion vectors directed to a direction corresponding to the rotation of the lid.

In some demonstrative embodiments, the motion vectors of image information 113 may indicate at least one orientation attribute of antennas 107, e.g., as described below.

In some demonstrative embodiments, the motion vectors may indicate a change in an elevation of antennas 107, an azimuth of antennas 107, and/or a roll of antennas 107. For example, the motion vectors may indicate a change in at least two orientation attributes, e.g. a change in the elevation and a change in the azimuth of antennas 107.

In some demonstrative embodiments, controller 112 may be able to determine the orientation attributes of antennas 107 based on the motion vectors of image information 113 and, optionally, other information, for example, a focal length of camera 114.

In some demonstrative embodiments, controller 112 may determine the orientation attribute of antennas 107 based on the motion vectors, the focal length of camera 114 and a relative location of antennas 107 with respect to camera 114.

In one example, antennas 107 and camera 114 may be housed within a common part and/or element of device 102. In another example, antennas 107 and camera 114 may be housed within separate parts and/or elements of device 102, e.g., antennas 107 may be housed within a lid of device 102 and camera 114 may be housed within a base of device 102. For example, controller 112 may determine the orientation attribute of antennas 107 based on the relative location of antennas 107 within the base of device 102 with respect to the location of camera 114 within the lid of device 102.

Figure 2A:
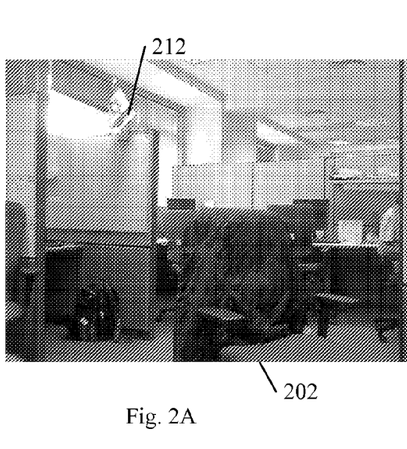
FIGS. 2A-2C are illustrations of three subsequent images captured during a rotation of a mobile device around a vertical axis, in accordance with some demonstrative embodiments.
Figure 2B:
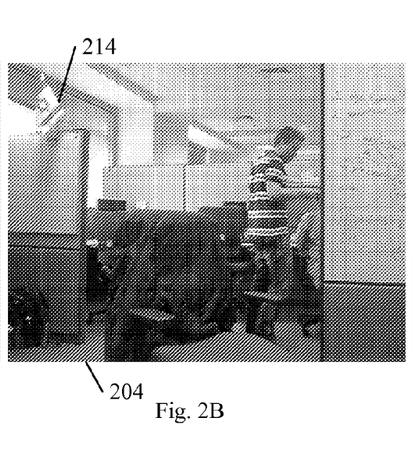
Figure 2C:
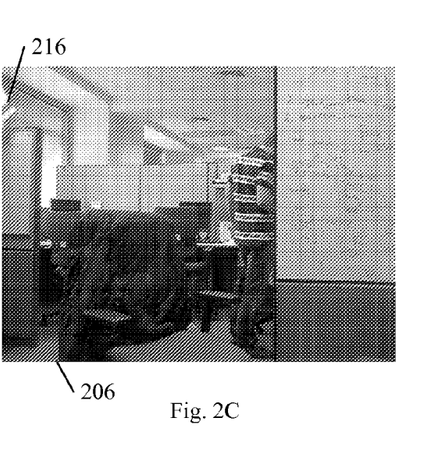

Reference is made to FIGS. 2A-2C, which illustrate three subsequent images 202, 204 and 206 captured during a rotation of a mobile device around a vertical axis, in accordance with some demonstrative embodiments.

For example, camera 114 (FIG. 1) may capture images 202, 204 and 206, and image information 113 (FIG. 1) may represent images 202, 204 and 206.

As shown in FIG. 2A-2C, images 202, 204 and 206 may include different images 212, 214 and 216, of a flag.

As shown in FIG. 2A-2C, a location of the flag in images 202, 204 and 206 may move towards the left boundary of the images. Accordingly, image information 113 (FIG. 1) may include motion vectors, which indicate a rotation of the mobile device around a vertical axis, e.g., a rotation to the right.

In some demonstrative embodiments, the rotation of the mobile device around the vertical axis may indicate a rotation of antennas 107 (FIG. 1) around the vertical axis.

Figure 3A:
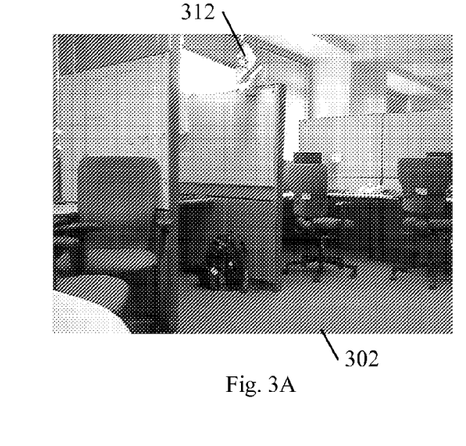
FIGS. 3A-3C are illustrations of three subsequent images captured during rotation of a lid of a mobile device, in accordance with some demonstrative embodiments.
Figure 3B:
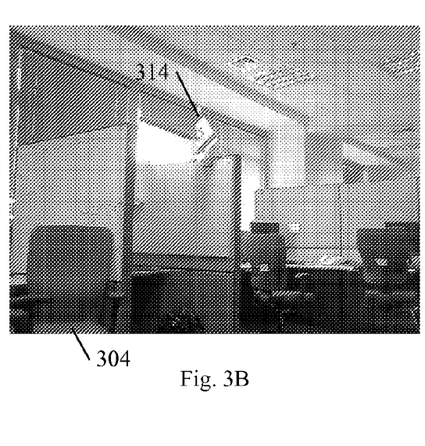
Figure 3C:
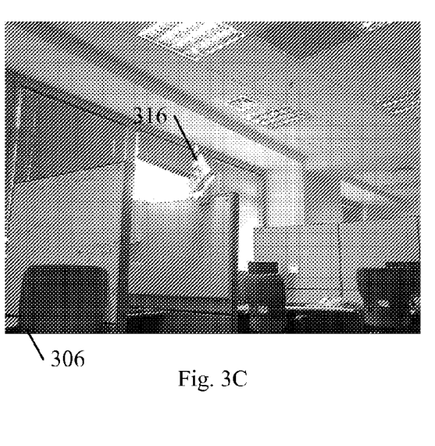

Reference is made to FIGS. 3A-3C, which illustrate three subsequent images 302, 304 and 306 captured during a rotation of a lid of a mobile device, in accordance with some demonstrative embodiments.

For example, camera 114 (FIG. 1) may be housed within a lid of device 102 (FIG. 1), and image information 113 (FIG. 1) may represent images 302, 304 and 306 captured by camera 114 (FIG. 1).

As shown in FIG. 3A-3C, images 302, 304 and 306 may include different images 312, 314 and 316, of a flag.

As shown in FIG. 3A-3C, a location of the flag in images 302, 304 and 306 may move towards the lower boundary of images 302, 304 and 306. Accordingly, image information 113 (FIG. 1) may include motion vectors, which indicate a rotation of the lid, e.g., an elevation of the lid.

In some demonstrative embodiments, the rotation of the lid may indicate a change in an orientation of antennas 107 (FIG. 1), e.g., if antennas 107 (FIG. 1) are housed within the lid. Alternatively, the rotation of the lid may not indicate a change in an orientation of antennas 107 (FIG. 1), e.g., if antennas 107 (FIG. 1) are housed within the base of device 102 (FIG. 1).

Referring back to FIG. 1, in some demonstrative embodiments, video processor 116 may provide to controller 112 image information 113 including the one or more motion vectors.

In some demonstrative embodiments, image information 113 may indicate a motion in a specific direction ("the detected direction").

For example, image information 113 may indicate the motion in the detected direction if, for example, at least a predefined percentage, e.g., seventy percent or any other percentage, of the motion vectors are directed to the same direction, or to a predefined range of directions, and an average length of the motion vectors, which are directed to the same direction, exceeds a predefined motion length threshold.

In some demonstrative embodiments, controller 112 may update the beamforming scheme of wireless beamformed link 103 based on the detected direction.

In some demonstrative embodiments, controller 112 may update the beamforming scheme of wireless communication link 103 by performing beamforming training with device 104.

In some demonstrative embodiments, controller 112 may perform the beamforming training in a direction opposite to the detected direction.

In some demonstrative embodiments, performing the beamforming training in the direction opposite to the detected direction may increase the probability that the beam direction of antennas 107 may be directed toward device 104.

For example, controller 112 may perform a beamforming scanning procedure in a counterclockwise direction, e.g., if the detected direction indicates a clockwise rotation of antennas 107 and accordingly, the location of device 104 is likely to be in a direction, which is counterclockwise to the rotation of antennas 107.

In another example, controller 112 may perform the beamforming scanning procedure in a part of a sphere and/or sectors, which are likely to include device 104, e.g., as indicated by the detected direction.

In some demonstrative embodiments, controller 112 may estimate a change in the orientation attributes of antennas 107 based on the detected direction.

In some demonstrative embodiments, controller 112 may update the beamforming scheme of antennas 107 based on the estimated change in the orientation attributes of antennas 107, e.g., as described below.

In some demonstrative embodiments, controller 112 may update the beamforming scheme of antennas 107 based on a first comparison between an elevation change of the elevation of antennas 107 and a predefined elevation threshold, a second comparison between an azimuth change of the azimuth of antennas 107 and a predefined azimuth threshold, and/or a third comparison between a roll change of the roll of antennas 107 and a predefined roll threshold.

For example, controller 112 may update the beamforming scheme, e.g., if the elevation change of the elevation of antennas 107 exceeds the predefined elevation threshold, the azimuth change of the azimuth of antennas 107 exceeds the predefined azimuth threshold, and/or the roll change of the roll of antennas 107 exceeds the predefined roll threshold.

In some demonstrative embodiments, controller 112 may update the beamforming scheme of antennas 107 by changing the directionality of antennas 107 based on the estimated change of the orientation attributes of antennas 107. For example, controller 112 may update the beamforming scheme of antennas 107 based on the elevation change and/or the azimuth change of antennas 107.

In some demonstrative embodiments, controller 112 may update the beamforming scheme of antennas 107 by changing the directionality of antennas 107 in a direction opposite to a direction indicated by the estimated change of the orientation attributes of antennas 107. For example, controller 112 may update the beamforming scheme of antennas 107 by changing the directionality of antennas 107 in a direction opposite to a direction indicated by the elevation change and/or the azimuth change of antennas 107.

In one example, controller 112 may update the beamforming scheme of antennas 107 to change the directionality of antennas 107 to an azimuth, which is ninety degrees right to a current azimuth of antennas 107, e.g., if the azimuth change of antennas 107 includes an azimuth change of ninety degrees to the left.

In some demonstrative embodiments, controller 112 may update the beamforming scheme of antennas 107 by performing beamforming training with device 104, for example, if changing the directionality of antennas 107 may not result in an improvement and/or increase of a signal quality over wireless communication link 103 and/or if link 103 is disconnected.

In some demonstrative embodiments, controller 112 may update the beamforming scheme of antennas 107, by performing the beamforming training in a direction opposite to the estimated change of the orientation attributes of antennas 107. For example, controller 112 may perform the beamforming training in a direction opposite to a direction indicated by the elevation change and/or the azimuth change of antennas 107.

In one example, controller 112 may initiate a beamforming scanning procedure to begin from an azimuth of 50 degrees counterclockwise from a current directionality of antennas 107, e.g., if the estimated change of an azimuth of antennas 107 includes a clockwise azimuth change of 50 degrees, for example, since the location of device 104 is likely to be in a direction, which is 50 degrees counterclockwise from the current directionality of antennas 107.

In another example, controller 112 may perform the beamforming scanning procedure in a part of a sphere and/or sectors, which are likely to include device 104, e.g., as indicated by the elevation and/or azimuth change of antennas 107.

In some demonstrative embodiments, controller 112 may receive image information 113 representing an image captured by camera 114. Controller 112 may determine an azimuth change of antennas 107, denoted Δφ, and an elevation change of antennas 107, denoted 4θ, based on a comparison between the image information 113 and image information of one or more previously captured images by camera 114. For example, controller 112 may determine the azimuth change and/or the elevation change based on the motion vectors calculated between the image and the previously captured images, a focal length of camera 114, and/or any other information.

In some demonstrative embodiments, controller 112 may accumulate the azimuth change and/or the elevation change from a last beamforming training session, e.g., as follows:

$$\theta \leftarrow \theta + \Delta\theta, \phi \leftarrow \phi + \Delta\phi, \quad (1)$$

wherein φ denotes the total accumulated azimuth change, and θ denotes the total elevation change since the last beamforming training.

In some demonstrative embodiments, controller 112 may compare the total azimuth change to a predefined azimuth threshold, denoted φTH, and/or the total elevation change to a predefined elevation threshold, denoted θTH.

In some demonstrative embodiments, controller 112 may determine if the total azimuth change exceeds the azimuth threshold and/or the total elevation change exceeds the elevation threshold, e.g., according to the following criteria:

$$\phi > \phi TH \text{ or } \theta > \theta TH \quad (2)$$

In some demonstrative embodiments, controller 112 may update the beamforming scheme, e.g., if the criteria are met. For example, controller 112 may update the beamforming scheme by performing beamforming training in a new sector centered around a direction opposite to the total azimuth change φ and/or to the total elevation change θ, e.g., as follows:

$$(\alpha - \phi), (\beta - \theta) \quad (3)$$

wherein α and β denote the azimuth and the elevation of antennas 107 at a current sector.

In some demonstrative embodiments, performing the beamforming training procedure in one direction and/or using a limited sector may require a relatively short period of time, e.g., as a result of performing the beamforming training in a defined direction, for example, one sector.

In some demonstrative embodiments, performing the beamforming training procedure in one direction and/or using a limited sector may reduce a power consumption of devices 104 and 102, e.g., due to the short period of time required to perform the beamforming training.

In some demonstrative embodiments, performing the beamforming training procedure in one direction and/or using a limited sector may improve a quality of wireless communication link 103, e.g., by performing the beamforming training upon detecting a placement change of device 102 and/or antennas 107, e.g., prior to detecting a reduction in the quality of wireless communication link 103.

Figure 4:
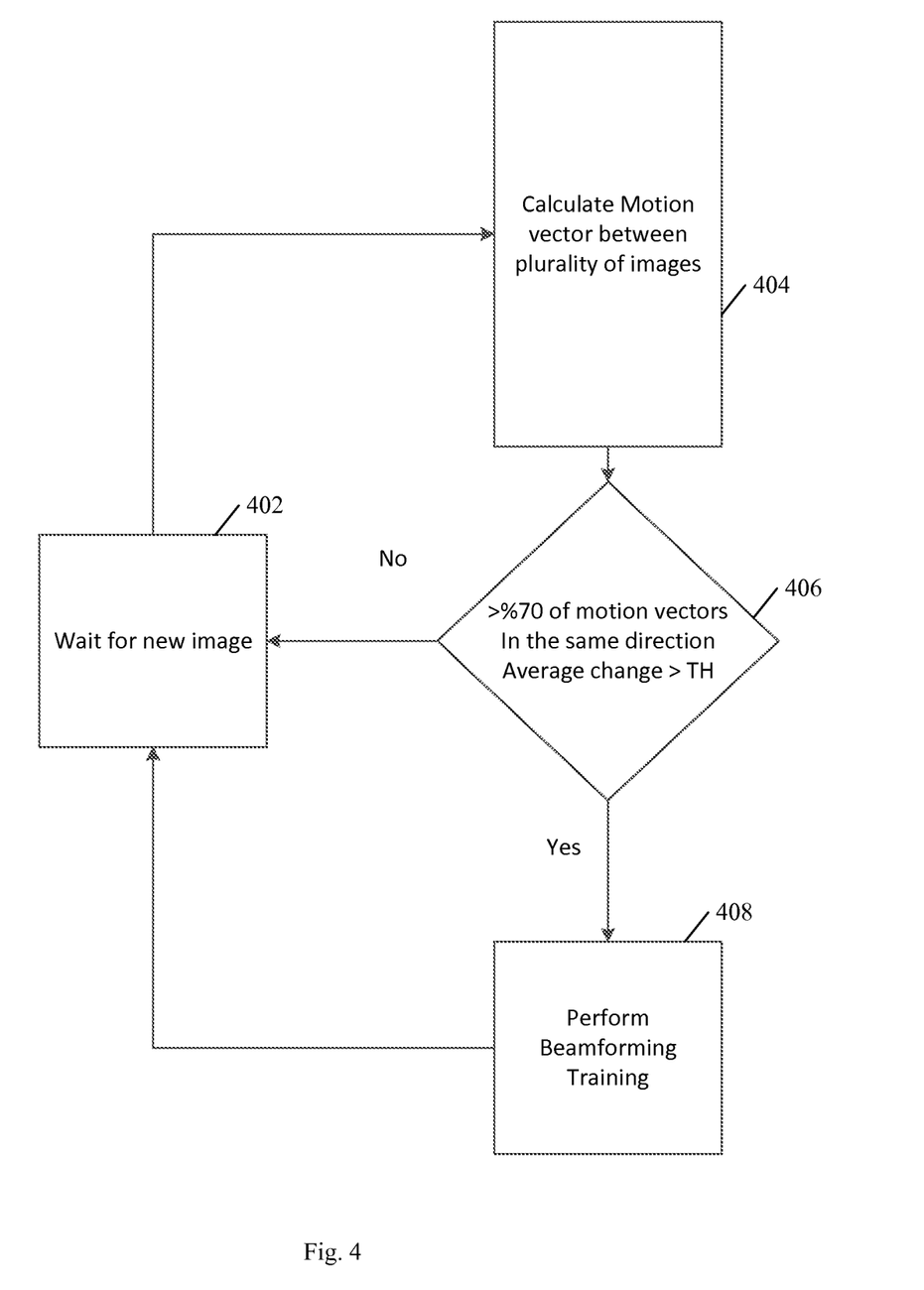
FIG. 4 is a schematic flow-chart illustration of a method of selectively performing beamforming training based on images captured by a mobile device, in accordance with some demonstrative embodiments.

Reference now made to FIG. 4, which schematically illustrates a method of selectively performing beamforming training based on images captured by a mobile device, in accordance with some demonstrative embodiments. In some embodiments, one or more of the operations of the method of FIG. 4 may be performed by a wireless communication system, e.g., system 100 (FIG. 1); a mobile device, e.g., device 102 (FIG. 1); a controller, e.g., controller 112 (FIG. 1), and/or a wireless communication unit, e.g., wireless communication unit 110 (FIG. 1).

As indicated at block 402, the method may include waiting for information of a new captured image. For example, video processor 116 (FIG. 1) may wait for image information from camera 114 (FIG. 1), e.g., as described above.

As indicated at block 404, the method may include calculating motion vectors between the captured image and one or more previously captured images. For example, controller 112 (FIG. 1) may calculate motion vectors between the captured image and the previously captured images, e.g., as described above.

As indicated at block 406, the method may include determining whether or not at least a predefined percentage of the motion vectors are directed to the same direction, and the average length of the motion vectors, which are directed to the same direction, exceeds a predefined motion length threshold. For example, controller 112 (FIG. 1) may determine whether or not at least a predefined percentage, e.g., seventy percent, of the motion vectors are directed in the same direction, and the average length of the motion vectors, which are directed to the same direction, exceeds the predefined motion length threshold, e.g., as described above.

As indicated at block 408, the method may include updating the beamforming scheme, if at least the predefined percentage of the motion vectors are directed to the same direction, and the average length of the motion vectors, which are directed to the same direction, exceeds the predefined motion length threshold. For example, controller 112 (FIG. 1) may update the beamforming scheme. For example, controller 112 may update the beamforming scheme in a direction opposite to the detected direction indicated by the motion vectors.

In some demonstrative embodiments, the method may include waiting for a new image, if at least the predefined percentage of the motion vectors are not directed to the same direction, the average length of the motion vectors, which are directed to the same direction, does not exceed the predefined motion length threshold, and/or after performing the beamforming training, e.g., as described above.

Figure 5:
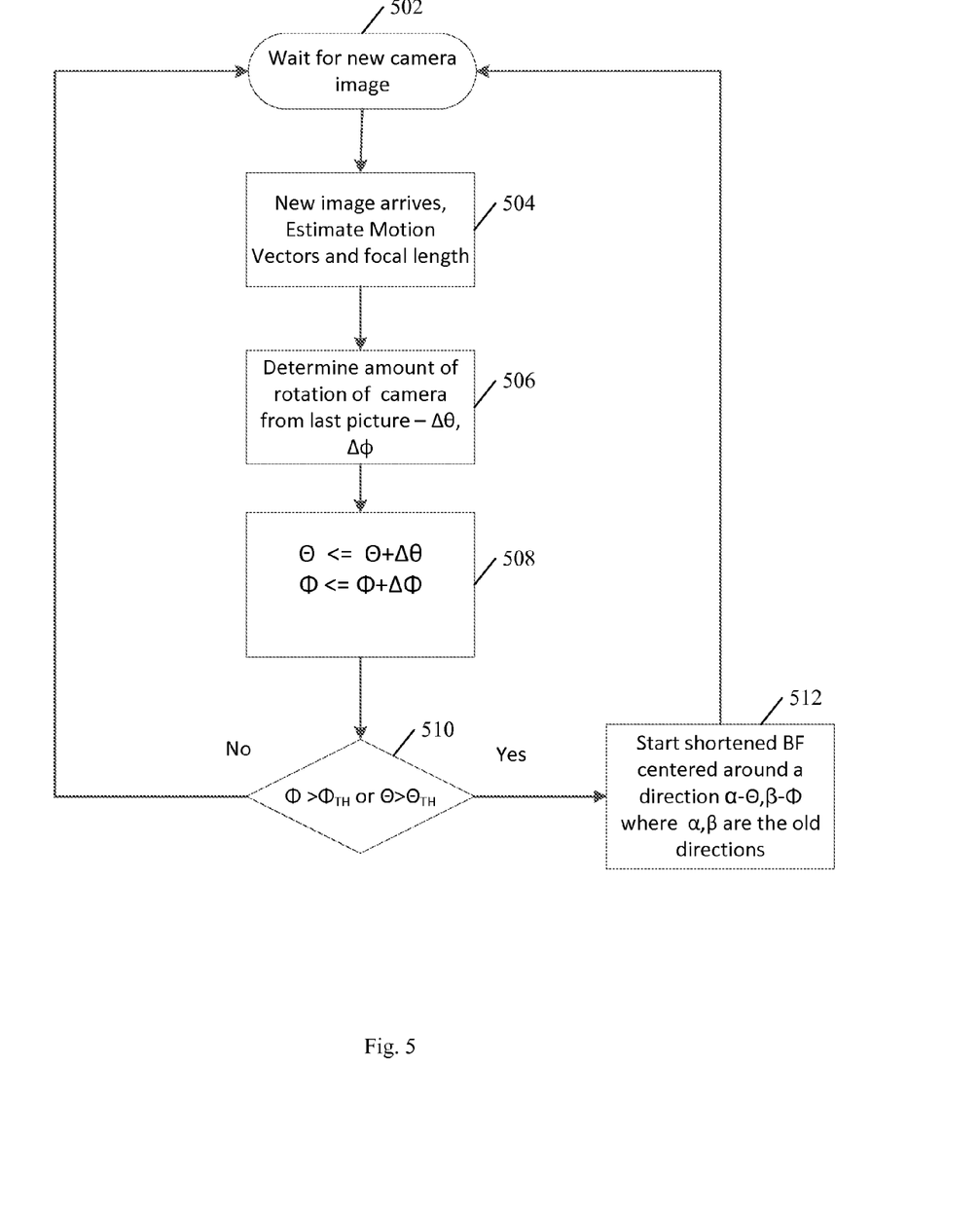
FIG. 5 is a schematic flow-chart illustration of a method of selectively updating a beamforming scheme, in accordance with some demonstrative embodiments.

Reference is made to FIG. 5, which schematically illustrates a method of selectively updating a beamforming scheme, in accordance with some demonstrative embodiments. In some embodiments, one or more of the operations of the method of FIG. 5 may be performed by a wireless communication system, e.g., system 100 (FIG. 1); a mobile device, e.g., device 102 (FIG. 1); a controller, e.g., controller 112 (FIG. 1), and/or a wireless communication unit, e.g., wireless communication unit 110 (FIG. 1).

As indicated at block 502, the method may include waiting for information of a new captured image from a camera. For example, video processor 116 (FIG. 1) may wait for image information from camera 114 (FIG. 1), e.g., as described above.

As indicated at block 504, the method may include estimating motion vectors and focal length of the camera based on the captured image. For example, video processor 116 (FIG. 1) may estimate the motion vectors based on the captured image, e.g., as described above.

As indicated at block 506, the method may include determining an amount of a change of an orientation attribute between the captured image and a previously captured image. For example, controller 112 (FIG. 1) may estimate the change of the azimuth and/or the elevation of antennas 107 based on image information 113 (FIG. 1), e.g., as described above.

As indicated at block 508, the method may include determining the total azimuth change and/or the total elevation change from last beamforming training. For example, controller 112 (FIG. 1) may accumulate the azimuth changes and the elevation changes of antennas 107 (FIG. 1) from the last beamforming training, e.g., as described above.

As indicated at block 510, the method may include determining whether or not the total elevation change exceeds a predefined elevation threshold, and/or the total azimuth change exceeds a predefined azimuth threshold. For example, controller 112 (FIG. 1) may determine whether or not the total elevation change of antennas 107 (FIG. 1) exceeds the predefined elevation threshold, and/or the total azimuth change of antennas 107 (FIG. 1) exceeds the predefined azimuth threshold, e.g., as described above.

As indicated at block 512, the method may include updating the beamforming scheme, e.g., if the change in the total orientation attribute since last beamforming training exceeds the predefined threshold of the orientation attribute. For example, updating the beamforming scheme may include performing beamforming training centered around a direction opposite to a direction indicated by the total azimuth change and the total elevation change. For example, controller 112 (FIG. 1) may update the beamforming scheme by performing beamforming training around a direction centered around a direction, which is opposite to the total azimuth change and/or to the total elevation change if, for example, the total azimuth change $\phi$ is greater than the azimuth threshold $\phi TH$, and/or the total elevation change $\theta$ is greater than the elevation threshold $\theta TH$, e.g., as described above.

In some demonstrative embodiments, the method may include waiting for a new image, e.g., if the total change in the orientation attribute since last beamforming training does not exceed the predefined threshold of the orientation attribute. For example, controller 112 (FIG. 1) may wait for image information 113 (FIG. 1) corresponding to a new image captured by camera 114 (FIG. 1), e.g., as described above.

Figure 6:
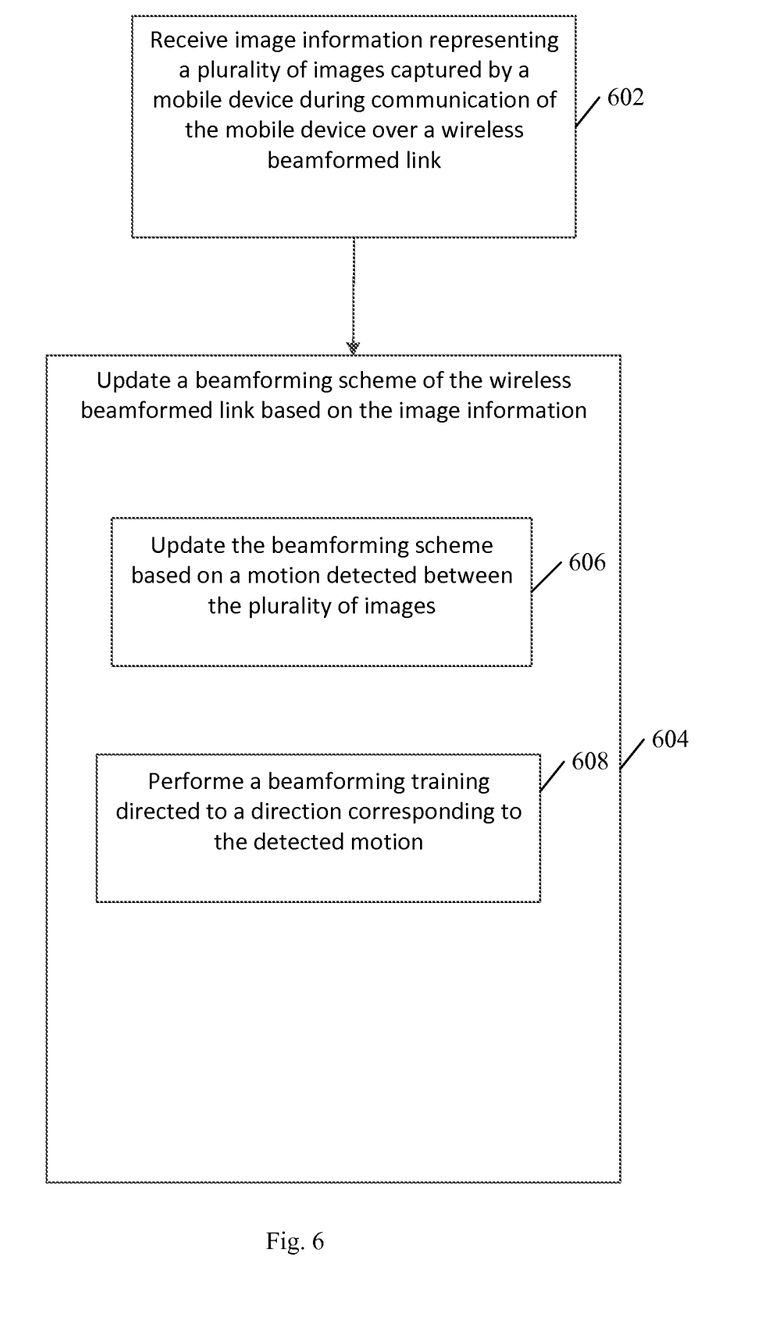
FIG. 6 is a schematic flow-chart illustration of a method of wireless beamformed communication, in accordance with some demonstrative embodiments.

Reference is made to FIG. 6, which schematically illustrates a method of wireless beamformed communication, in accordance with some demonstrative embodiments. In some embodiments, one or more of the operations of the method of FIG. 6 may be performed by a wireless communication system, e.g., system 100 (FIG. 1); a mobile device, e.g., device 102 (FIG. 1); a controller, e.g., controller 112 (FIG. 1), and/or a wireless communication unit, e.g., wireless communication unit 110 (FIG. 1).

As indicated at block 602, the method may include receiving image information representing a plurality of images captured by a mobile device during communication of the mobile device over a wireless beamformed link. For example, controller 112 (FIG. 1) may receive image information 113 (FIG. 1) representing a plurality of images captured by camera 114 (FIG. 1), e.g., as described above.

As indicated at block 604, the method may include updating a beamforming scheme of the wireless beamformed link based on the image information. For example, controller 112 (FIG. 1) may update the beamforming scheme of wireless communication link 103 (FIG. 1) based on image information 113, e.g., as described above.

As indicated at block 606, updating the beamforming scheme of the wireless beamformed link may include updating the beamforming scheme based on a motion detected between the plurality of images. For example, controller 112 (FIG. 1) may update the beamforming scheme of wireless communication link 103 based on the motion detected between the plurality of images captured by camera 114 (FIG. 1), e.g., as described above.

As indicated at block 608, updating the beamforming scheme of the wireless beamformed link may include performing a beamforming training directed to a direction opposite to the detected motion. For example, controller 112 (FIG. 1) may update the beamforming scheme of wireless communication link 103 (FIG. 1) by performing a beamforming training directed to a direction corresponding to the detected motion, e.g., as described above.

Figure 7:
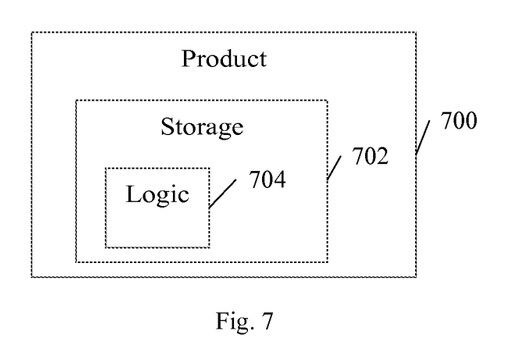
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of device 102 (FIG. 1), device 104 (FIG. 1), wireless communication unit 110 (FIG. 1), wireless communication unit 120 (FIG. 1), and/or controller 112 (FIG. 1) and/or to perform one or more operations of the methods of FIG. 4, FIG. 5 and/or FIG. 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 is an apparatus comprising a controller to receive image information representing a plurality of images captured by a mobile device during communication of the mobile device over a wireless beamformed link, and to update a beamforming scheme of the wireless beamformed link based on the image information.

Example 2 includes the subject matter of Example 1 and optionally, wherein the controller is to update the beamforming scheme based on a motion detected between the plurality of images.

Example 3 includes the subject matter of Example 1 or 2 and optionally, wherein the mobile device is to communicate over the wireless beamformed link via an antenna array, wherein the image information indicates a change of at least one placement related attribute of the antenna array, and wherein the controller is to update the beamforming scheme based on the placement related attribute.

Example 4 includes the subject matter of Example 3 and optionally, wherein the at least one placement related attribute includes at least one attribute selected from the group consisting of an orientation of the antenna array and a movement of the antenna array.

Example 5 includes the subject matter of Example 5 and optionally, wherein the at least one placement related attribute includes at least one orientation attribute selected from the group consisting of an elevation of the antenna array, an azimuth of the antenna array, and a roll of the antenna array.

Example 6 includes the subject matter of Example 5 and optionally, wherein the controller is to update the beamforming scheme based on at least one comparison selected from the group consisting of a first comparison between an elevation change of the elevation of the antenna array and a predefined elevation threshold, a second comparison between an azimuth change of the azimuth of the antenna array and a predefined azimuth threshold, and a third comparison between a roll change of the roll of the antenna array and a predefined roll threshold.

Example 7 includes the subject matter of any one of Examples 3-6 and optionally, wherein the image information includes one or more motion vectors, and wherein the controller is to estimate the placement related attribute based on the motion vectors.

Example 8 includes the subject matter of Example 7 and optionally, wherein the controller is to update the beamforming scheme by performing a beamforming training directed to a direction opposite to a direction of the motion vectors.

Example 9 includes the subject matter of any one of Examples 3-8 and optionally, wherein the image information indicates a rotation of a lid of the mobile device including the antenna array.

Example 10 includes the subject matter of any one of Examples 1-9 and optionally, wherein the image information indicates a movement of the mobile device.

Example 11 includes the subject matter of Example 10 and optionally, wherein the controller is to update the beamforming scheme by performing a beamforming training based on a direction of the movement.

Example 12 includes the subject matter of any one of Examples 1-11 and optionally, wherein the controller is to receive the image information periodically.

Example 13 includes the subject matter of any one of Examples 1-12 and optionally, wherein the wireless beamformed link comprises a wireless beamformed link in a 60 Gigahertz (GHZ) frequency band.

Example 14 is a system comprising a mobile device including an antenna array; a radio to communicate with a wireless communication device via the antenna array over a wireless beamformed link; a camera to capture a plurality of images during communication over the wireless beamformed link; and a controller to receive image information representing the plurality of images, and to update a beamforming scheme of the wireless beamformed link based on the image information.

Example 15 includes the subject matter of Example 14 and optionally, wherein the controller is to update the beamforming scheme based on a motion detected between the plurality of images.

Example 16 includes the subject matter of Example 14 or 15 and optionally, wherein the image information indicates a change of at least one placement related attribute of the antenna array, and wherein the controller is to update the beamforming scheme based on the placement related attribute.

Example 17 includes the subject matter of Example 16 and optionally, wherein the at least one placement related attribute includes at least one attribute selected from the group consisting of an orientation of the antenna array and a movement of the antenna array.

Example 18 includes the subject matter of Example 17 and optionally, wherein the at least placement related attribute includes at least one orientation attribute selected from the group consisting of an elevation of the antenna array, an azimuth of the antenna array, and a roll of the antenna array.

Example 19 includes the subject matter of Example 18 and optionally, wherein the controller is to update the beamforming scheme based on at least one comparison selected from the group consisting of a first comparison between an elevation change of the elevation of the antenna array and a predefined elevation threshold, a second comparison between an azimuth change of the azimuth of the antenna array and a predefined azimuth threshold, and a third comparison between a roll change of the roll of the antenna array and a predefined roll threshold.

Example 20 includes the subject matter of any one of Examples 16-19 and optionally, wherein the image information includes one or more motion vectors, and wherein the controller is to estimate the placement related attribute based on the motion vectors.

Example 21 includes the subject matter of Example 20 and optionally, wherein the controller is to update the beamforming scheme by performing a beamforming training directed to a direction opposite to a direction of the motion vectors.

Example 22 includes the subject matter of any one of Examples 16-21 and optionally, wherein the image information indicates a rotation of a lid of the mobile device including the antenna array.

Example 23 includes the subject matter of any one of Examples 14-22 and optionally, wherein the image information indicates a movement of the mobile device.

Example 24 includes the subject matter of Example 23 and optionally, wherein the controller is to update the beamforming scheme by performing a beamforming training based on a direction of the movement.

Example 25 includes the subject matter of any one of Examples 14-24 and optionally, wherein the controller is to receive the image information periodically.

Example 26 includes the subject matter of any one of Examples 14-25 and optionally, wherein the wireless beamformed link comprises a wireless beamformed link in a 60 Gigahertz (GHZ) frequency band.

Example 27 is a method comprising receiving image information representing a plurality of images captured by a mobile device during communication of the mobile device over a wireless beamformed link; and updating a beamforming scheme of the wireless beamformed link based on the image information.

Example 28 includes the subject matter of Example 27 and optionally, wherein updating the beamforming scheme comprises updating the beamforming scheme based on a motion detected between the plurality of images.

Example 29 includes the subject matter of Example 27 or 28 and optionally, comprising communicating over the wireless beamformed link via an antenna array, wherein the image information indicates a change of at least one placement related attribute of the antenna array, and wherein updating the beamforming scheme comprises updating the beamforming scheme based on the placement related attribute.

Example 30 includes the subject matter of Example 29 and optionally, wherein the at least one placement related attribute includes at least one attribute selected from the group consisting of an orientation of the antenna array and a movement of the antenna array.

Example 31 includes the subject matter of Example 30 and optionally, wherein the at least one placement related attribute includes at least one orientation attribute selected from the group consisting of an elevation of the antenna array, an azimuth of the antenna array, and a roll of the antenna array.

Example 32 includes the subject matter of Example 31 and optionally, wherein updating the beamforming scheme comprises updating the beamforming scheme based on at least one comparison selected from the group consisting of a first comparison between an elevation change of the elevation of the antenna array and a predefined elevation threshold, a second comparison between an azimuth change of the azimuth of the antenna array and a predefined azimuth threshold, and a third comparison between a roll change of the roll of the antenna array and a predefined roll threshold.

Example 33 includes the subject matter of any one of Examples 29-32 and optionally, wherein the image information includes one or more motion vectors, the method comprising estimating the placement related attribute based on the motion vectors.

Example 34 includes the subject matter of Example 33 and optionally, wherein updating the beamforming scheme comprises performing a beamforming training directed to a direction opposite to a direction of the motion vectors.

Example 35 includes the subject matter of any one of Examples 29-34 and optionally, wherein the image information indicates a rotation of a lid of the mobile device including the antenna array.

Example 36 includes the subject matter of any one of Examples 27-35 and optionally, wherein the image information indicates a movement of the mobile device.

Example 37 includes the subject matter of Example 36 and optionally, wherein updating the beamforming scheme comprises performing a beamforming training based on a direction of the movement.

Example 38 includes the subject matter of any one of Examples 27-37 and optionally, wherein the wireless beamformed link comprises a wireless beamformed link in a 60 Gigahertz (GHZ) frequency band.

Example 39 is a product including a non-transitory storage medium having stored thereon instructions that, when executed by a machine, result in receiving image information representing a plurality of images captured by a mobile device during communication of the mobile device over a wireless beamformed link; and updating a beamforming scheme of the wireless beamformed link based on the image information.

Example 40 includes the subject matter of Example 39 and optionally, wherein updating the beamforming scheme comprises updating the beamforming scheme based on a motion detected between the plurality of images.

Example 41 includes the subject matter of Example 39 or 40 and optionally, comprising communicating over the wireless beamformed link via an antenna array, wherein the image information indicates a change of at least one placement related attribute of the antenna array, and wherein updating the beamforming scheme comprises updating the beamforming scheme based on the placement related attribute.

Example 42 includes the subject matter of Example 41 and optionally, wherein the at least one placement related attribute includes at least one attribute selected from the group consisting of an orientation of the antenna array and a movement of the antenna array.

Example 43 includes the subject matter of Example 42 and optionally, wherein the at least one placement related attribute includes at least one orientation attribute selected from the group consisting of an elevation of the antenna array, an azimuth of the antenna array, and a roll of the antenna array.

Example 44 includes the subject matter of Example 43 and optionally, wherein updating the beamforming scheme comprises updating the beamforming scheme based on at least one comparison selected from the group consisting of a first comparison between an elevation change of the elevation of the antenna array and a predefined elevation threshold, a second comparison between an azimuth change of the azimuth of the antenna array and a predefined azimuth threshold, and a third comparison between a roll change of the roll of the antenna array and a predefined roll threshold.

Example 45 includes the subject matter of any one of Examples 41-44 and optionally, wherein the image information includes one or more motion vectors, the instructions resulting in estimating the placement related attribute based on the motion vectors.

Example 46 includes the subject matter of Example 45 and optionally, wherein updating the beamforming scheme comprises performing a beamforming training directed to a direction opposite to a direction of the motion vectors.

Example 47 includes the subject matter of any one of Examples 41-46 and optionally, wherein the image information indicates a rotation of a lid of the mobile device including the antenna array.

Example 48 includes the subject matter of any one of Examples 39-47 and optionally, wherein the image information indicates a movement of the mobile device.

Example 49 includes the subject matter of Example 48 and optionally, wherein updating the beamforming scheme comprises performing a beamforming training based on a direction of the movement.

Example 50 includes the subject matter of any one of Examples 39-49 and optionally, wherein the wireless beamformed link comprises a wireless beamformed link in a 60 Gigahertz (GHZ) frequency band.

Example 51 includes an apparatus comprising means for receiving image information representing a plurality of images captured by a mobile device during communication of the mobile device over a wireless beamformed link; and means for updating a beamforming scheme of the wireless beamformed link based on the image information.

Example 52 includes the subject matter of Example 51 and optionally, wherein the means for updating comprises means to update the beamforming scheme based on a motion detected between the plurality of images.

Example 53 includes the subject matter of Example 51 or 52 and optionally, wherein the mobile device is to communicate over the wireless beamformed link via an antenna array, wherein the image information indicates a change of at least one placement related attribute of the antenna array, and wherein the means for updating comprises means to update the beamforming scheme based on the placement related attribute.

Example 54 includes the subject matter of Example 53 and optionally, wherein the at least one placement related attribute includes at least one attribute selected from the group consisting of an orientation of the antenna array and a movement of the antenna array.

Example 55 includes the subject matter of Example 54 and optionally, wherein the at least one placement related attribute includes at least one orientation attribute selected from the group consisting of an elevation of the antenna array, an azimuth of the antenna array, and a roll of the antenna array.

Example 56 includes the subject matter of Example 55 and optionally, wherein the means for updating comprises means to update the beamforming scheme based on at least one comparison selected from the group consisting of a first comparison between an elevation change of the elevation of the antenna array and a predefined elevation threshold, a second comparison between an azimuth change of the azimuth of the antenna array and a predefined azimuth threshold, and a third comparison between a roll change of the roll of the antenna array and a predefined roll threshold.

Example 57 includes the subject matter of any one of Examples 53-56 and optionally, wherein the image information includes one or more motion vectors, the apparatus 57 means to estimate the placement related attribute based on the motion vectors.

Example 58 includes the subject matter of Example 57 and optionally, wherein the means for updating comprises means to update the beamforming scheme by performing a beamforming training directed to a direction opposite to a direction of the motion vectors.

Example 59 includes the subject matter of any one of Examples 53-58 and optionally, wherein the image information indicates a rotation of a lid of the mobile device including the antenna array.

Example 60 includes the subject matter of any one of Examples 51-59 and optionally, wherein the image information indicates a movement of the mobile device.

Example 61 includes the subject matter of Example 60 and optionally, comprising means for performing a beamforming training based on a direction of the movement.

Example 62 includes the subject matter of any one of Examples 51-61 and optionally, wherein the wireless beamformed link comprises a wireless beamformed link in a 60 Gigahertz (GHZ) frequency band.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a controller to receive image information representing a plurality of images captured by a mobile device during communication of said mobile device over a wireless beamformed link via an antenna array, the controller configured to process the image information to determine a change of at least one placement related attribute of said antenna array, and to update a beamforming scheme of said wireless beamformed link based on the placement related attribute.

2. The apparatus of claim 1, wherein said controller is to update said beamforming scheme based on a motion detected between said plurality of images.

3. The apparatus of claim 1, wherein said at least one placement related attribute includes at least one attribute selected from the group consisting of an orientation of said antenna array and a movement of said antenna array.

4. The apparatus of claim 3, wherein said at least one placement related attribute includes at least one orientation attribute selected from the group consisting of an elevation of said antenna array, an azimuth of said antenna array, and a roll of said antenna array.

5. The apparatus of claim 4, wherein said controller is to update said beamforming scheme based on at least one comparison selected from the group consisting of a first comparison between an elevation change of the elevation of said antenna array and a predefined elevation threshold, a second comparison between an azimuth change of the azimuth of said antenna array and a predefined azimuth threshold, and a third comparison between a roll change of the roll of said antenna array and a predefined roll threshold.

6. The apparatus of claim 1, wherein said image information includes one or more motion vectors, and wherein said controller is to estimate said placement related attribute based on said motion vectors.

7. The apparatus of claim 6, wherein said controller is to update said beamforming scheme by performing a beamforming training directed to a direction opposite to a direction of said motion vectors.

8. The apparatus of claim 1, wherein said image information indicates a rotation of a lid of said mobile device including said antenna array.

9. The apparatus of claim 1, wherein said image information indicates a movement of said mobile device.

10. The apparatus of claim 9, wherein said controller is to update said beamforming scheme by performing a beamforming training based on a direction of said movement.

11. The apparatus of claim 1, wherein said controller is to receive said image information periodically.

12. The apparatus of claim 1, wherein said wireless beamformed link comprises a wireless beamformed link in a 60 Gigahertz (GHZ) frequency band.

13. A system comprising:
a mobile device including:
an antenna array;
a radio to communicate with a wireless communication device via said antenna array over a wireless beamformed link;
a camera to capture a plurality of images during communication over said wireless beamformed link; and
a controller to receive image information representing said plurality of images, said image information indicating a change of at least one placement related attribute of said antenna array, the controller configured to update a beamforming scheme of said wireless beamformed link based on the placement related attribute.

14. The system of claim 13, wherein said controller is to update said beamforming scheme based on a motion detected between said plurality of images.

15. The system of claim 13, wherein said at least placement related attribute includes at least one orientation attribute selected from the group consisting of an elevation of said antenna array, an azimuth of said antenna array, and a roll of said antenna array.

16. The system of claim 13, wherein said at least one placement related attribute includes at least one attribute selected from the group consisting of an orientation of said antenna array and a movement of said antenna array.

17. The system of claim 13, wherein said image information includes one or more motion vectors, and wherein said controller is to estimate said placement related attribute based on said motion vectors.

18. The system of claim 17, wherein said controller is to update said beamforming scheme by performing a beamforming training directed to a direction opposite to a direction of said motion vectors.

19. The system of claim 13, wherein said image information indicates a movement of said mobile device.

20. The system of claim 19, wherein said controller is to update said beamforming scheme by performing a beamforming training based on a direction of said movement.

21. A method to be performed by a controller implemented at a mobile device, the method comprising:

processing, by said controller, image information representing a plurality of images captured by the mobile device during communication of said mobile device over a wireless beamformed link via an antenna array, said image information indicating a change of at least one placement related attribute of said antenna array; and updating, by said controller, a beamforming scheme of said wireless beamformed link based on the placement related attribute.

22. The method of claim 21, wherein updating said beamforming scheme comprises updating said beamforming scheme based on a motion detected between said plurality of images.

23. The method of claim 21, wherein said at least one placement related attribute includes at least one attribute selected from the group consisting of an orientation of said antenna array and a movement of said antenna array.

24. The method of claim 21, wherein said image information includes one or more motion vectors, the method comprising estimating said placement related attribute based on said motion vectors.

25. The method of claim 24, wherein updating said beamforming scheme comprises performing a beamforming training directed to a direction opposite to a direction of said motion vectors.

26. The method of claim 21, wherein said image information indicates a movement of said mobile device, and wherein updating said beamforming scheme comprises performing a beamforming training based on a direction of said movement.

27. A product comprising one or more tangible computer-readable non-transitory storage media comprising computer-executable instructions operable to, when executed by at least one computer processor, enable the at least one computer processor to implement operations at a mobile device, the operations comprising:
processing image information representing a plurality of images captured by the mobile device during communication of said mobile device over a wireless beamformed link via an antenna array, said image information indicating a change of at least one placement related attribute of said antenna array; and
updating a beamforming scheme of said wireless beamformed link based on the placement related attribute.

28. The product of claim 27, wherein updating said beamforming scheme comprises updating said beamforming scheme based on a motion detected between said plurality of images.

29. The product of claim 27, wherein said image information indicates a movement of said mobile device, and wherein updating said beamforming scheme comprises performing a beamforming training based on a direction of said movement.

* * * * *